United States Patent [19]

Viertel et al.

[11] Patent Number: 4,477,116
[45] Date of Patent: Oct. 16, 1984

[54] SUN VISOR FOR AUTOMOTIVE VEHICLES WITH MOLDING FOR VISOR BODY COVERING

[75] Inventors: Lothar Viertel, Saarlouis; Gert Mahler, Radevormwald, both of Fed. Rep. of Germany

[73] Assignee: Gebr. Happich GmbH, Fed. Rep. of Germany

[21] Appl. No.: 396,405

[22] Filed: Jul. 8, 1982

[30] Foreign Application Priority Data

Jul. 22, 1981 [DE] Fed. Rep. of Germany ....... 3128853

[51] Int. Cl.$^3$ .............................................. B60J 3/02
[52] U.S. Cl. .................................................. 296/97 H
[58] Field of Search ................ 296/97 H, 97 K, 97 R; 160/DIG. 3; 297/445, 455; 5/440

[56] References Cited

U.S. PATENT DOCUMENTS

| Re. 29,522 | 1/1978 | Barecki | 297/455 |
| 762,512 | 6/1904 | Busse | 297/455 |
| 2,301,080 | 11/1942 | Roberts | 296/97 K |
| 2,844,200 | 7/1958 | Herr et al. | 296/97 H |
| 4,000,404 | 12/1976 | Marcus | 296/97 H |
| 4,163,579 | 8/1979 | Mahler et al. | 296/97 H |
| 4,390,202 | 6/1983 | Flowerday et al. | 296/97 K |

FOREIGN PATENT DOCUMENTS 2933552  5/1981  Fed. Rep. of Germany ... 296/97 H

Primary Examiner—Robert B. Reeves
Assistant Examiner—Dennis H. Pedder
Attorney, Agent, or Firm—Ostrolenk, Faber, Gerb & Soffen

[57] ABSTRACT

The disclosure concerns a sun visor body having a flat core, which may be in the form of a plastic material insert, and which has a peripheral molding defined on it. A covering material for covering over the core is fastened to the outwardly facing side surfaces of the peripheral molding by being bonded or welded thereto or being attached by a heat-sensitive bonding agent. Foam padding layers may be placed between the core and the covering material.

21 Claims, 9 Drawing Figures

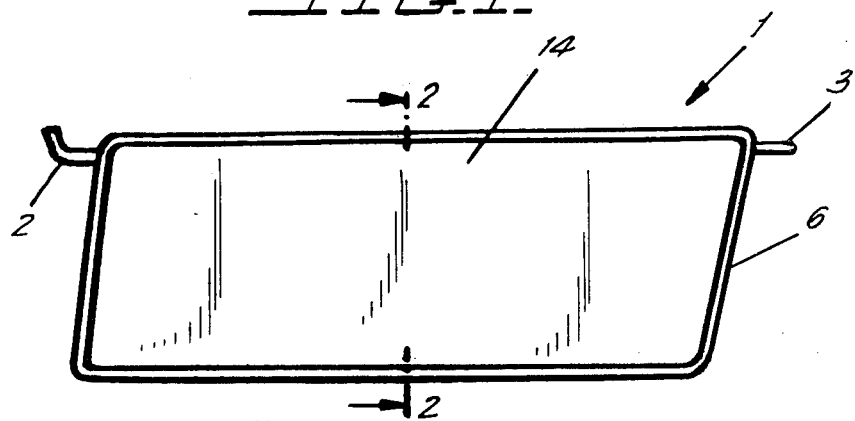
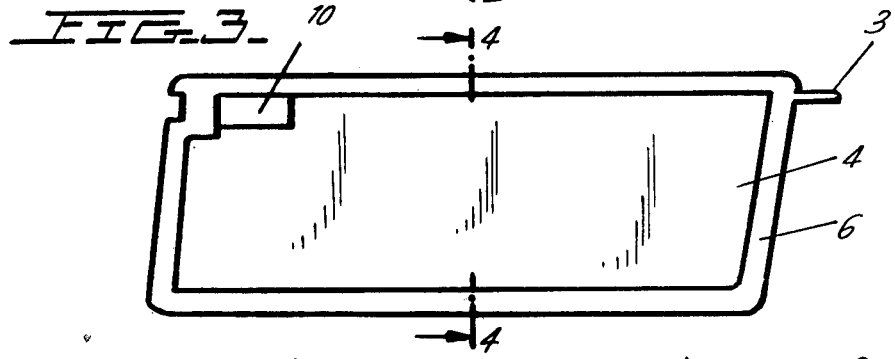
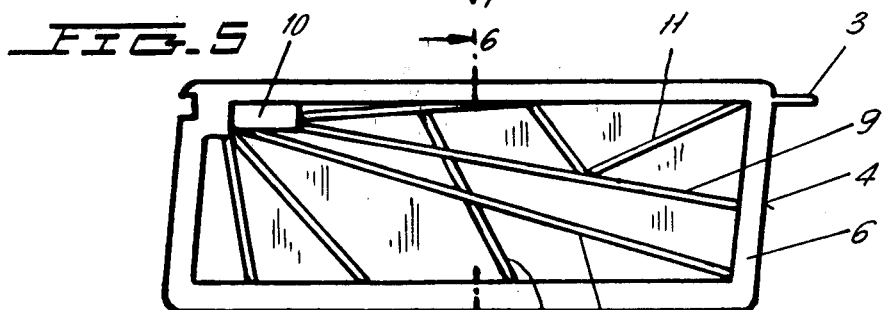
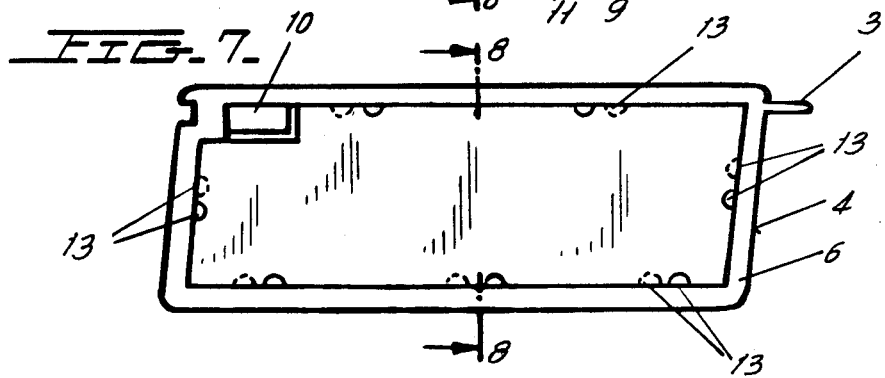

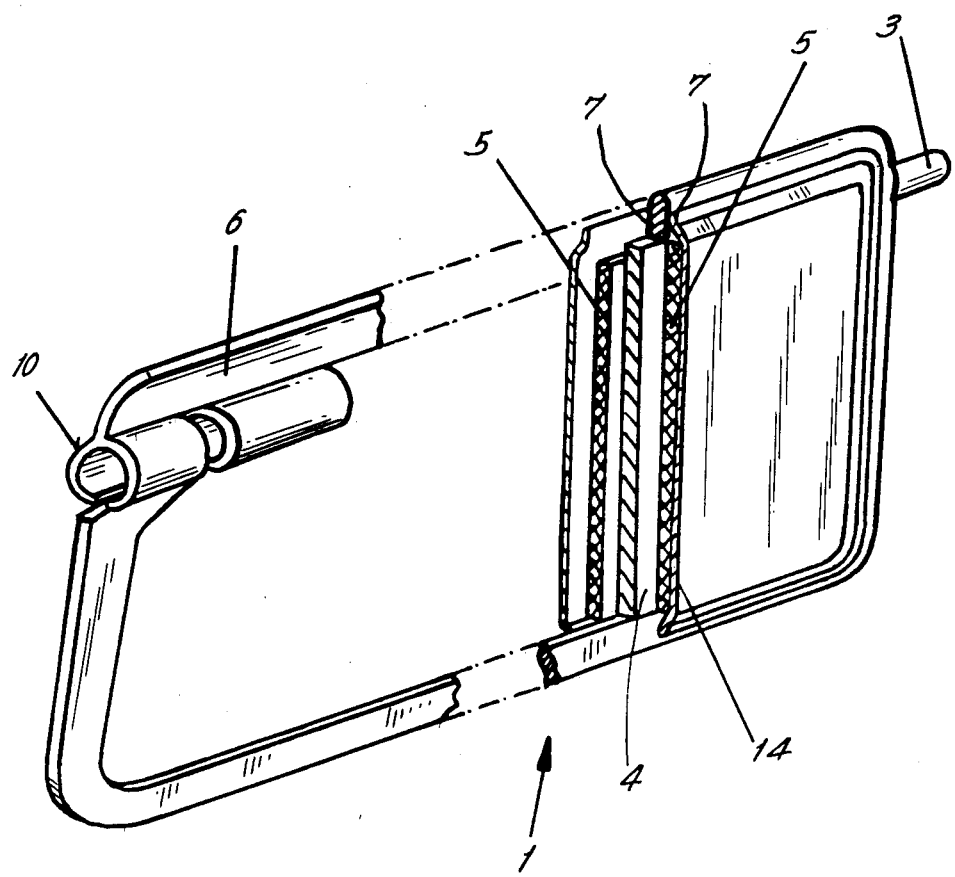

SUN VISOR FOR AUTOMOTIVE VEHICLES WITH MOLDING FOR VISOR BODY COVERING

FIELD OF THE INVENTION

The present invention relates to a sun visor for automotive vehicles, and particularly to a padded sun visor, having a relatively flat core which is covered by material which is welded or otherwise bonded onto the molding.

BACKGROUND OF THE INVENTION

A sun visor body is provided with a covering material which surrounds the core of the visor body and serves essentially to improve the appearance of the sun visor. The covering can be bonded in place relatively rapidly and simply with a welding electrode, provided that the covering material is capable of being welded, which is true particularly with plastic sheet covering material. Frequently, however, sun visors are desired whose covering consists of a non-weldable material such as textiles, natural leather, or the like. Fabrication of a sun visor body with a covering of non-weldable material requires a considerable amount of work since, until now, the pieces of covering material, cut to size, have been sewn together along the peripheral edge of the sun visor body and have then been trimmed.

SUMMARY OF THE INVENTION

The object of the present invention is to simplify the construction of a sun visor body, particularly with reference to the attachment of its covering, and to reduce its cost of production.

In order to achieve this object, in accordance with the invention, the supporting core of the visor body has a peripheral frame molding, which may be thicker than the core. On both of the opposite, outwardly facing side surfaces, i.e. the first and oppositely facing second side surfaces, facing in opposite directions, of the molding is fastened a peripheral edge region of the covering material. The covering material is bonded by being glued or welded onto the frame molding.

The invention affords a number of advantages. First, it is advantageous that the outer peripheral edge of the sun visor body is the peripheral molding. The resulting closure of the edge of the body is cosmetically excellent and is esthetically more pleasing than would be closure of the covering material by sewing, even if the sewn closure of the covering material were to be trimmed after sewing. Furthermore, the side surfaces of the peripheral molding offers good resting surfaces for attaching the edges of the covering material. The covering material can be fastened to the molding, regardless of whether the material is weldable or not. If the covering material is weldable or is provided on its inwardly facing rear surface with a firmly adherent weldable coating, it can be attached to the molding, which preferably consists of plastic, rapidly and simply by means of a welding electrode. By suitable development of the welding electrode, it is also possible to simultaneously trim the covering material in order to obtain a clean edge closure. On the other hand, if the covering material consists of a non-weldable textile material, natural leather, or the like, the covering material can be attached to the molding by gluing. For this purpose, a preferably heat-sensitive bonding agent is placed between the covering material and the molding. In this connection, at least the peripheral edge region of the covering material and/or of the molding has the bonding agent applied to it. In this way, it is possible to connect the covering material and the molding firmly to each other by a heating electrode, which can also have a cutting edge for trimming the covering material. It is also possible to equip a sun visor body with, for instance, a leather covering on one side surface and a textile covering on the other side. Furthermore, it is possible to adapt the color of the molding to the color of the covering material. Finally, the same fabricating machine may provide sun visor bodies with coverings which consist either of weldable or non-weldable materials or of a combination of such materials. This will eliminate the unnecessary costs of training in different types of attachment techniques.

Embodiments of the present invention will be apparent from the following description of the accompanying drawings.

BRIEF DESCRIPTION OF THE DRAWINGS

FIG. 1 is a front view of a sun visor body;

FIG. 3 shows a first embodiment of a core insert for the sun visor body;

FIG. 5 shows a second embodiment of an insert;

FIG. 7 shows another embodiment of an insert;

FIG. 9 is a perspective view of a sun visor body, partially broken away.

DESCRIPTION OF THE PREFERRED EMBODIMENTS

Figure 2:
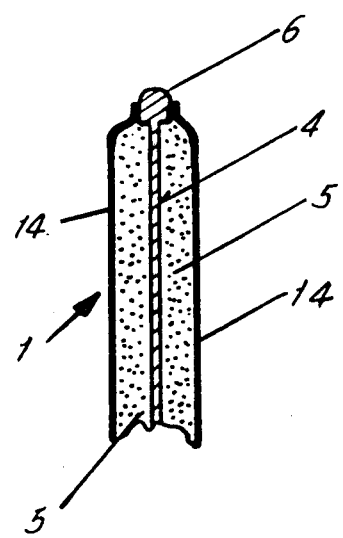
FIG. 2 is a section along the line II—II of FIG. 1.

The sun visor comprises a sun visor body 1 having a mounting shaft 2 which can be arranged on a swivel bearing (not shown) at which the sun visor is attached to the vehicle body. The sun visor body 1 also includes a mounting pin 3, which can be arranged on an outer support, not shown, for the visor body.

The sun visor body 1 has a relatively flat core, which comprises an insert 4 for stiffening the visor body and the core has a cushioning body 5 arranged on both outwardly facing oppositely directed first and second surfaces above the first and second sides of the insert.

Figure 4:
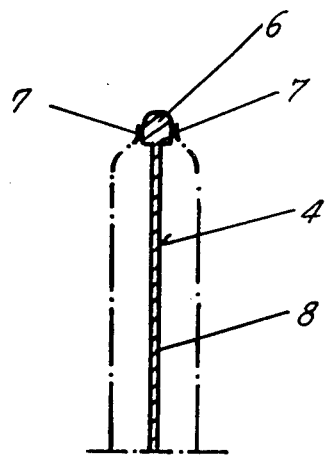
FIG. 4 is a section along the line IV—IV of FIG. 3.

The insert 4 is substantially rectangular in shape. It includes an outer peripheral molding 6 of a relatively thicker cross-section, as compared with the remainder of the insert. This molding defines the peripheries of the first and second sides of the insert. The molding 6 extends around the peripheries of the first and second sides. There is a mount 10 arranged in the region of the upper corner of the visor body remote from the mounting pin 3 and nearer the swivel bearing. Mount 10 serves as means for mounting the sun visor to a vehicle or other similar structure. As can be seen by comparing FIGS. 1, 3 and 9, mounting shaft 2, for example, may have one end which fits into mount 10, which may in turn have a generally cylindrical opening. The peripheral molding 6 has smooth, opposite, outwardly facing side surfaces 7, which preferably extend parallel to each other. They extend in the same oppositely directed first and second directions as the corresponding sides of the insert itself. In the embodiments shown in FIGS. 3 to 6, the insert 4 and the mount 10 together with the molding 6 form a one-piece integral unit, which may consist of a plastic injection molding. In FIG. 4, a plate 8, which is thinner than the molding 6, is provided as the insert 4. The insert may possibly also be conventionally provided with openings (not shown) in order to save material and weight.

Figure 6:
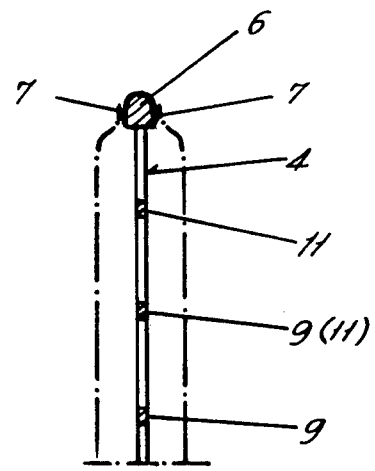
FIG. 6 is a section along the line VI—VI of FIG. 5.

FIGS. 5 and 6 show an embodiment of an insert 4 having struts 9 arranged inside the frame defined inside the peripheral molding 6. There are intermediate struts 11 which in part connect the struts 9 to each other. The struts 9 extend from the mount 10 in the direction of tensile stress, i.e. approximately in the direction toward the corner of the molding 6 which is diagonally opposite the mount 10. See, for example, U.S. Pat. No. 4,163,579. Because the tension-absorbing struts 9 extend from a fixed point of the insert 4, namely from the mount 10, and in the direction of likely deformation of the sun-visor body 1, they take up all stresses which occur.

Figure 8:
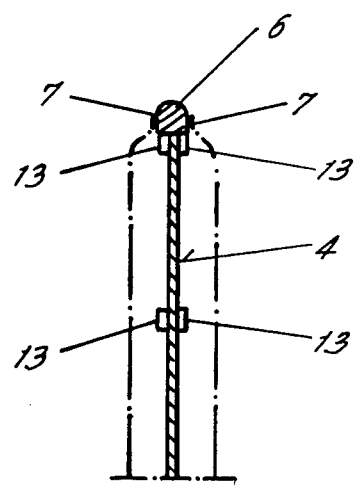
FIG. 8 is a section along the line VIII—VIII of FIG. 7.

In the embodiment shown in FIGS. 7 and 8, the space surrounded by the molding 6 is filled by an insert plate 12, which may consist of pressboard, or the like. The insert plate 12 is held approximately in the median plane of the sun visor body 1 by tongues 13, which are developed on the inner edge of the molding 6.

In all of the embodiments, the molding 6 is developed with relatively large-area oppositely directed, first and second side surfaces 7, which helps assure secure application of the peripheral edge regions of the covering material 14 to these side surfaces. Relatively large-area resting regions between the side surfaces 7 of the molding 6 and the edge regions of the covering material 14, however, also make a reliable, firm and permanent connection of these parts possible. Depending on the nature of the material or the pre-treatment of the covering material 14, the connection is preferably developed as an adhesive or welded connection. If the covering material consists of a weldable or suitably coated sheet, a weld connection is preferred because the molding 6 and the covering material 14 can be securely bonded by a welding electrode, without additional means. For producing an adhesive connection, on the other hand, a bonding agent is required between the molding 6 and the covering material 14. The molding 6 and/or at least the edge region of the covering material 14 is then preferably coated with a heat-sensitive bonding agent. The bonding agent is activated by a heating electrode or similar device (not shown), whereby the molding 6 and the covering material 14 are firmly connected to each other.

FIG. 9 shows the construction of a complete sun visor body 1. The core is formed of an insert 4 with its integral peripheral molding 6. The cushioning or padded body 5, consisting of foam plastic, or the like, is superposed as respective foam pads on opposite side surfaces of the insert. The body 5 is covered over the outsides of both of its pads by the covering material 14, whose peripheral edge regions are fastened, as described above, to the molding 6. The molding 6 extends outwardly to its peripheral outer edge region which is beyond and peripherally around the edges of the covering material and which joins the opposite first and second side surfaces of the molding 6. The resulting protruding region of the molding 6 is larger or smaller for esthetic appearance. The exposed outer edge of the molding 6 is rounded, so that the sun visor may satisfy safety requirements.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A sun visor for a motor vehicle, or the like, comprising:

a relatively flat core having a first side facing a first direction, a second side facing a second direction generally opposite the first direction, and a peripheral around the first and second sides; the core having a peripheral molding extending around the periphery around the first and second sides; the peripheral molding having opposite outwardly facing first and second side surfaces facing generally in the first and second directions, respectively and an exposed outer edge joining the first and second side surfaces;

covering material extending over the first and second sides of the core and having first and second peripheral edge regions for extending to and being secured to the opposite first and second side surfaces, respectively, of the peripheral molding, thereby covering over the core up to the peripheral molding without covering the exposed outer edge of the peripheral molding.

2. The sun visor of claim 1, wherein the covering material is bonded to the first and second side surfaces of the molding.

3. The sun visor of claim 2, wherein the covering material is welded to the first and second side surfaces of the molding.

4. The sun visor of claim 2, wherein there is a heat-sensitive bonding agent inserted between the covering material and the first and second side surfaces of the molding for bonding the covering material to the molding.

5. The sun visor of claim 1, wherein the covering material is so sized and shaped and placed with respect to the peripheral molding that the exposed outer edge of the peripheral molding protrudes beyond the first and second peripheral edge regions of the covering material, the outer edge of the peripheral molding thereby defining a peripheral outer edge around the sun visor.

6. The sun visor of claim 5, wherein the first and second side surfaces of the peripheral molding are spaced apart and the outer edge of the molding is rounded.

7. The sun visor of claim 5, wherein the core comprises an insert for stiffening the sun visor.

8. The sun visor of claim 7, wherein the peripheral molding is an integral part of the insert.

9. The sun visor of claim 5, wherein the peripheral molding defines a substantially rectangular contour; the core further comprising a mount arranged in a corner region of the rectangular contour for serving as means for mounting the sun visor to a vehicle, or the like.

10. The sun visor of claim 1, wherein the core comprises an insert for stiffening the sun visor.

11. The sun visor of claim 10, wherein the peripheral molding is an integral part of the insert.

12. The sun visor of any of claims 7, 10 or 11, wherein the insert is comprised of a plastic injection molding.

13. The sun visor of claim 12, wherein the peripheral molding defines a substantially rectangular contour; the core further comprising a mount arranged in a corner region of the rectangular contour for serving as means for mounting the sun visor to a vehicle, or the like.

14. The sun visor of claim 10, wherein the peripheral molding defines a substantially rectangular contour; the core further comprising a mount arranged in a corner region of the rectangular contour for serving as means for mounting the sun visor to a vehicle, or the like.

15. The sun visor of any of claims 1, 5, 10 or 11, further comprising padded bodies disposed at the first and second sides of the core and within the covering provided by the covering material.

16. The sun visor of claim 15, wherein the padded bodies comprise padding layers of foam plastic material.

17. The sun visor of claim 15, wherein the peripheral molding is thicker between the opposite first and second side surfaces thereof than the remainder of the core.

18. The sun visor of any of claims 1, 2, 5 or 6, wherein the peripheral molding is thicker between the opposite first and second side surfaces thereof than the remainder of the core.

19. The sun visor of any of claims 7, 8 or 11 wherein the peripheral molding is thicker between the opposite first and second side surfaces thereof than the remainder of the core.

20. The sun visor of claim 1, wherein the peripheral molding has a peripheral outer edge region and the outer edge region of the molding is rounded.

21. The sun visor of claim 1, wherein the first and second side surfaces of the peripheral molding are spaced apart, the outer edge extending between the first and second side surfaces for joining them.

* * * * *